(12) United States Patent
Hiraoka et al.

(10) Patent No.: US 8,796,572 B2
(45) Date of Patent: Aug. 5, 2014

(54) VEHICLE CONDITION DETECTION DEVICE AND METHOD FOR MANUFACTURING THE SAME

(75) Inventors: Yuji Hiraoka, Tokyo (JP); Tsutomu Kishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 189 days.

(21) Appl. No.: 13/259,052

(22) PCT Filed: Jul. 14, 2009

(86) PCT No.: PCT/JP2009/003298
§ 371 (c)(1),
(2), (4) Date: Sep. 22, 2011

(87) PCT Pub. No.: WO2011/007385
PCT Pub. Date: Jan. 20, 2011

(65) Prior Publication Data
US 2012/0009816 A1  Jan. 12, 2012

(51) Int. Cl.
*H01R 3/00* (2006.01)

(52) U.S. Cl.
USPC ............................................. 200/293

(58) Field of Classification Search
None
See application file for complete search history.

(56) References Cited

U.S. PATENT DOCUMENTS

| | | | | |
|---|---|---|---|---|
| 7,375,406 B2 * | 5/2008 | Lamb et al. | | 257/424 |
| 2006/0138633 A1 * | 6/2006 | Naruse et al. | | 257/688 |

FOREIGN PATENT DOCUMENTS

| | | | |
|---|---|---|---|
| JP | 04-244965 | A | 9/1992 |
| JP | 08-159881 | A | 6/1996 |
| JP | 2000-356561 | A | 12/2000 |
| JP | 3382030 | B2 | 12/2002 |
| JP | 2003-251655 | A | 9/2003 |
| JP | 3620185 | B2 | 11/2004 |
| JP | 2008-286727 | A | 11/2008 |

* cited by examiner

*Primary Examiner* — Renee Luebke
*Assistant Examiner* — Ahmed Saeed
(74) *Attorney, Agent, or Firm* — Birch, Stewart, Kolasch & Birch, LLP (57) ABSTRACT

A molding process is performed by molds such that a primarily molded body 12 mounted with a detecting element 11 for detecting a vehicle condition is subjected to a secondary molding process, and that a hollow portion 19 within a connector housing portion 15 to be formed by the secondary molding process is penetrated to the face area of the primarily molded body 12 corresponding to the position of the detecting element 11.

11 Claims, 6 Drawing Sheets

PRIOR ART

VEHICLE CONDITION DETECTION DEVICE AND METHOD FOR MANUFACTURING THE SAME

TECHNICAL FIELD

The present invention relates to a vehicle condition detection device for detecting the condition of a vehicle with a detecting element for acceleration, angular velocity, or the like, for example, and a method of manufacturing the detection device.

BACKGROUND ART

Figure 12:
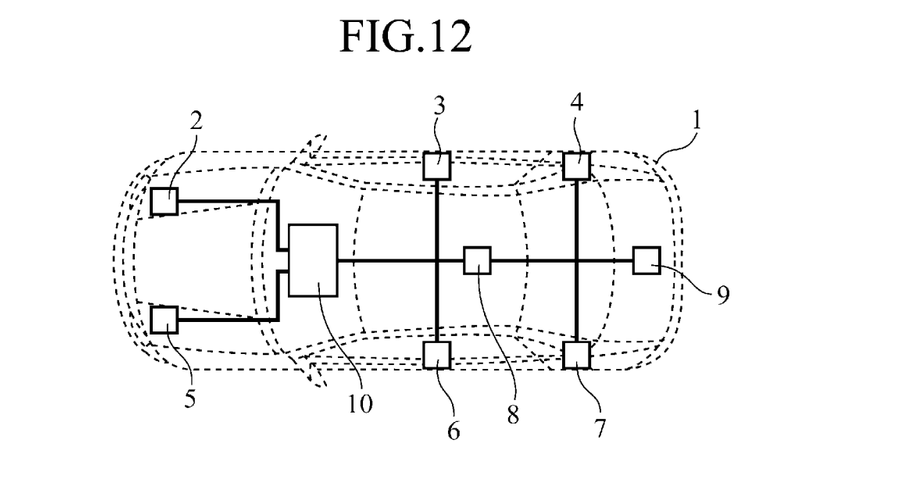
FIG. 12 is an explanatory view showing an example of configuration where the vehicle condition detection devices are used.

A vehicle condition detection device is produced such that a detecting element for acceleration, angular velocity or the like, for example, is resin molded, and used as, for example, a sensor for an airbag device or an attitude control device of an automobile. Vehicle condition detection devices are disposed as shown in FIG. 12, for example, in the case of the airbag device. To be more specific, vehicle condition detection devices 2, 5 are arranged in an engine room of a vehicle 1, a vehicle condition detection device 8 is disposed under a sheet, vehicle condition detection devices 3, 4, 6, 7 are disposed within pillars, and a vehicle condition detection device 9 is arranged in a trunk room. At the time of collision, a condition detection signal is sent to an air bag controller 10, and thereby an airbag (not shown) is instantaneously blown up to protect an occupant. As mentioned above, since the vehicle condition detection device occupies a small space, and is disposed in a plurality of places, it is required that the device be small in size, lightweight, and low-priced. On the other hand, since the vehicle condition detection device affects vehicle safety, it is desired to have uniform product stability and further be able to maintain a high precision performance under severe environments for a long term, which is known as high reliability.

Figure 13:
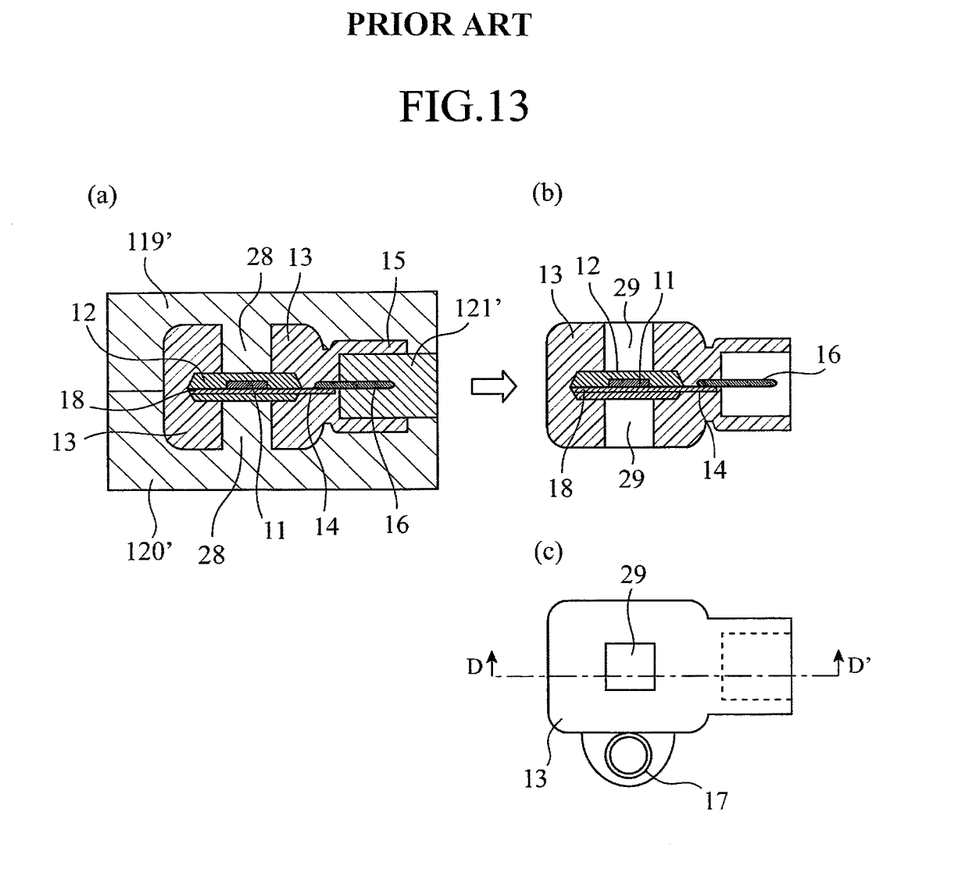
FIG. 13 is an explanatory view showing a molding method used for a secondarily molded body for a conventional vehicle condition detection device.

A structure of a conventional vehicle condition detection device, and molding molds thereof are shown in FIG. 13. A detecting element 11 for detecting the condition of a vehicle is mounted on a lead frame 18, and a molding process is implemented therearound with a resin to form a primarily molded body 12. A lead terminal 14 of the detecting element 11 formed by the lead frame 18 is extended from the primarily molded body 12. The primarily molded body 12 is subjected to a secondary process to shape the detecting element 11 as a connector for wiring and add thereto a structure secured to a vehicle. First, the lead terminal 14 is welded to a connector terminal 16 for connecting the lead terminal to an external harness. Then, in order to form a connector housing and a fastening portion, the primarily molded body 12 is held in a predetermined space between an upper mold 119' and a lower mold 120', and a resin is injected into a space between the two molds and the primarily molded body 12 to mold a secondarily molded body 13. When the secondary molding process is carried out, the primarily molded body 12 having the detecting element 11 located therein is sandwiched between convex primarily-molded-body-holding portions 28, 28, which are provided in the upper mold 119' and the lower mold 120', respectively, and are opposed to each other, to be held, and also restrain the application of a thermal stress on the detecting element 11 upon a resin injection. Further, the connector terminal 16 is inserted into a sliding mold 121' and held therein. In the case of the above method, a portion of the secondarily molded body 13 serving as a casing of a vehicle condition detection device, in other words, a trace caused by pulling-out of the primarily-molded-body-holding portions 28, 28 is formed by a vertical hole 29 that communicates from the outside to the face of the primarily molded body 12, as shown in FIG. 13(b) and FIG. 13(c).

Moreover, Patent Document 1 discloses a technique by which an air-tight type detecting element structure and a signal processing circuit of an acceleration sensor are fixed on a lead frame; a wire bonding between the detecting element structure, the signal processing circuit, and the lead frame is carried out; thereafter, the resultant is completely molded therearound with a plastic material; and at that time, a thermal stress relaxation mechanism is arranged to be provided in the detecting element structure or a plastic structure enclosing the detecting element structure such that the deformation of the detecting element structure itself that is caused by the thermal stress due to a difference in thermal expansion coefficient between the detecting element structure and the plastic material is minimized. The technology aims at producing a low cost, small-sized, and lightweight acceleration sensor by a mounting method of performing a full-mold process. Further, it is said that the arrangement of the thermal stress relaxation mechanism can minimize the deformation of the detecting element structure itself to thereby improve the temperature characteristic of the acceleration sensor.

PRIOR ART DOCUMENTS

Patent Documents

Patent Document 1: Japanese Patent No. 3382030

SUMMARY OF THE INVENTION

In the case of a conventional vehicle condition detection device as discussed above in FIG. 13, when the detection device is installed in a place susceptible to high temperature and humidity, it is necessary to isolate the primarily molded body 12 from the outside for the purpose of securing the reliability of the device. Therefore, there is a necessity to seal the vertical hole 29 communicating from the outside to the face of the primarily molded body 12 after the secondary molding process; thus, there is a problem of an increase in production cost to give rise to a sealing member and a sealing process thereof. Furthermore, when the seal member is in close proximity to the detecting element 11 of the primarily molded body 12, there is a problem such that consideration must be given to restrain the application of the stress caused by the seal member to the element.

On the other hand, one mode of the thermal stress relaxation mechanism disclosed in Patent Document 1 changes internal specifications of the detecting element structure itself of an acceleration sensor. However, the change involves a problem relating to the policy of the manufacturer of the acceleration sensor; it is substantially impossible to perform the mode in the case of a secondarily processing maker that makes use of the acceleration sensor. Further, another mode of the thermal stress relaxation mechanism is such that characteristics are provided in the shape of a full-molded plastic structure: for example, there are provided a method of preparing a groove or a concavity portion on the surface of a plastic structure; a method of evening up the thicknesses of a plastic material thereof to eliminate a local difference in thermal expansion coefficient, in the case where a detecting element structure and a signal processing circuit to be integrally molded are different in height from each other; and a method of performing a full-mold process while providing a metal plate under a plastic structure. However, there are no suggestions whether the above thermal stress relaxation mechanisms ease the thermal stress caused by the thermoplastic resin that has an effect on the detecting element, in the case where the secondary molding process is performed with the thermoplastic resin around the primarily molded body 12 incorporating the detecting element, as shown in FIG. 13.

The present invention has been made to solve the above-mentioned problems, and an object of the present invention is to provide a vehicle condition detection device and a method of manufacturing this device such that a primarily molded detecting element is subjected to a secondary molding process to construct a chassis, a connector housing, and a device fastening portion, with adding a feature eliminating the application of a thermal stress on the detecting element to the construction.

The vehicle condition detection device according to the present invention is arranged such that a hollow portion within a connector housing portion to be formed by a secondary molding process is penetrated to the face area of a primarily molded body that corresponds to the position of a detecting element to be interposed in the hollow portion.

According to the present invention, when a primarily molded detecting element is subjected to a secondary molding process, there is provided the hollow portion extending from the connector housing portion to the portion of a secondarily molded body corresponding to the position of the detecting element. Therefore, at the time of the secondary molding process, a resin used for the molding process is positioned away from the detecting element to thus cause hard applying the thermal stress of the injected resin to the detecting element. As a result, the occurrence of variations in the characteristics thereof can be avoided. Further, in the case where the vehicle condition detection device is also in service, the hollow portion is formed between the secondarily molded body and the detecting element, to thus avoid the application of the stress on the secondarily molded side to the detecting element. In general, in the similar type of device, a thermoplastic resin is employed for a resin employed for a casing, in consideration of the shock resistance and the molding properties for the connector housing; however, the thermoplastic resin causes a large thermal stress upon molding, and thus, it has been difficult to subject a resin-molded detecting element to a secondary molding process. However, according to the present invention, the thermoplastic resin is also available. Further, at the time of the use, when a connector as the counterpart is connected therewith, the hollow portion is sealed using a waterproof structure such as packing thereof or the like; therefore, air-tightness thereof can be secured, and also the hollow portion need not be purposely closed later, which can eliminate a sealing member and/or post processings.

BEST MODE FOR CARRYING OUT THE INVENTION

Embodiments of the present invention will now be described with reference to the accompanying drawings in order to explain the present invention in more detail.

First Embodiment

Figure 1:
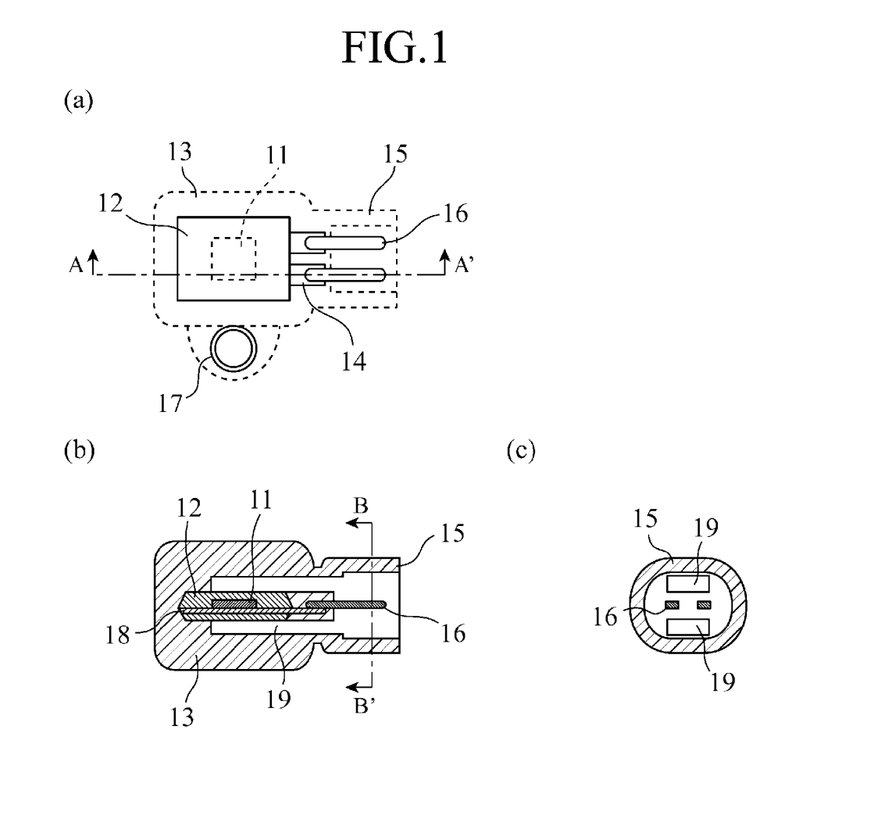
FIG. 1 is an explanatory view showing a structure of a full-mold mounting type of a vehicle condition detection device according to a first embodiment of the present invention.

FIG. 1 is an explanatory view showing a structure of a full-mold mounting type of a vehicle condition detection device according to a first embodiment of the present invention: FIG. 1(*a*) is a perspective plan view thereof, FIG. 1 (*b*) is a sectional view thereof along the line A-A', and FIG. 1 (*c*) is a sectional view thereof along the line B-B'.

The vehicle condition detection device employs a primarily molded body 12 that is resin molded under a condition where a detecting element for acceleration, angular velocity, or the like for detecting a vehicle condition is mounted on a lead frame 18. A lead terminal 14 of the detecting element 11 is extended from the primarily molded body 12 to the outside and welded to a connector terminal 16. In the vehicle condition detection device, the primarily molded body 12 is further subjected to a secondary molding process with a thermoplastic resin; thus, it is schemed that a secondarily molded body 13 thus obtained serves as a casing of the device. It is configured that the primarily molded body 12 is supported at one end thereof by the secondarily molded body 13 to be disposed within a hollow portion (cavity) 19 formed in the secondarily molded body 13. It is configured that a connector housing portion 15 is provided in the secondarily molded body 13, and that a connector terminal 16 is disposed within the connector housing portion 15 to be connected to an external connector. The hollow portion 19 is penetrated from the interior of the housing to the portion corresponding to the mounted position of the detecting element 11 to be interposed therein. Further, a device fastening portion 17 including a hole, for example, is provided by integration on the periphery of the secondarily molded body 13.

Figure 2:
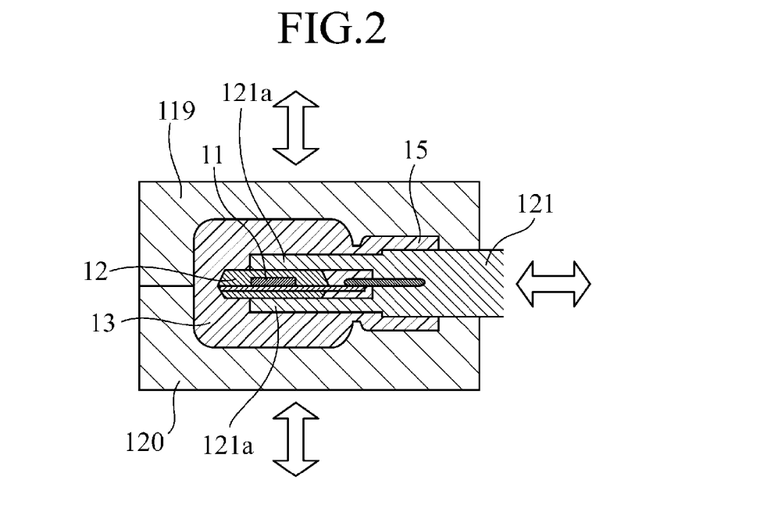
FIG. 2 is a sectional view showing a structure of a molding mold for the vehicle condition detection device of the first embodiment thereof.
Figure 3:
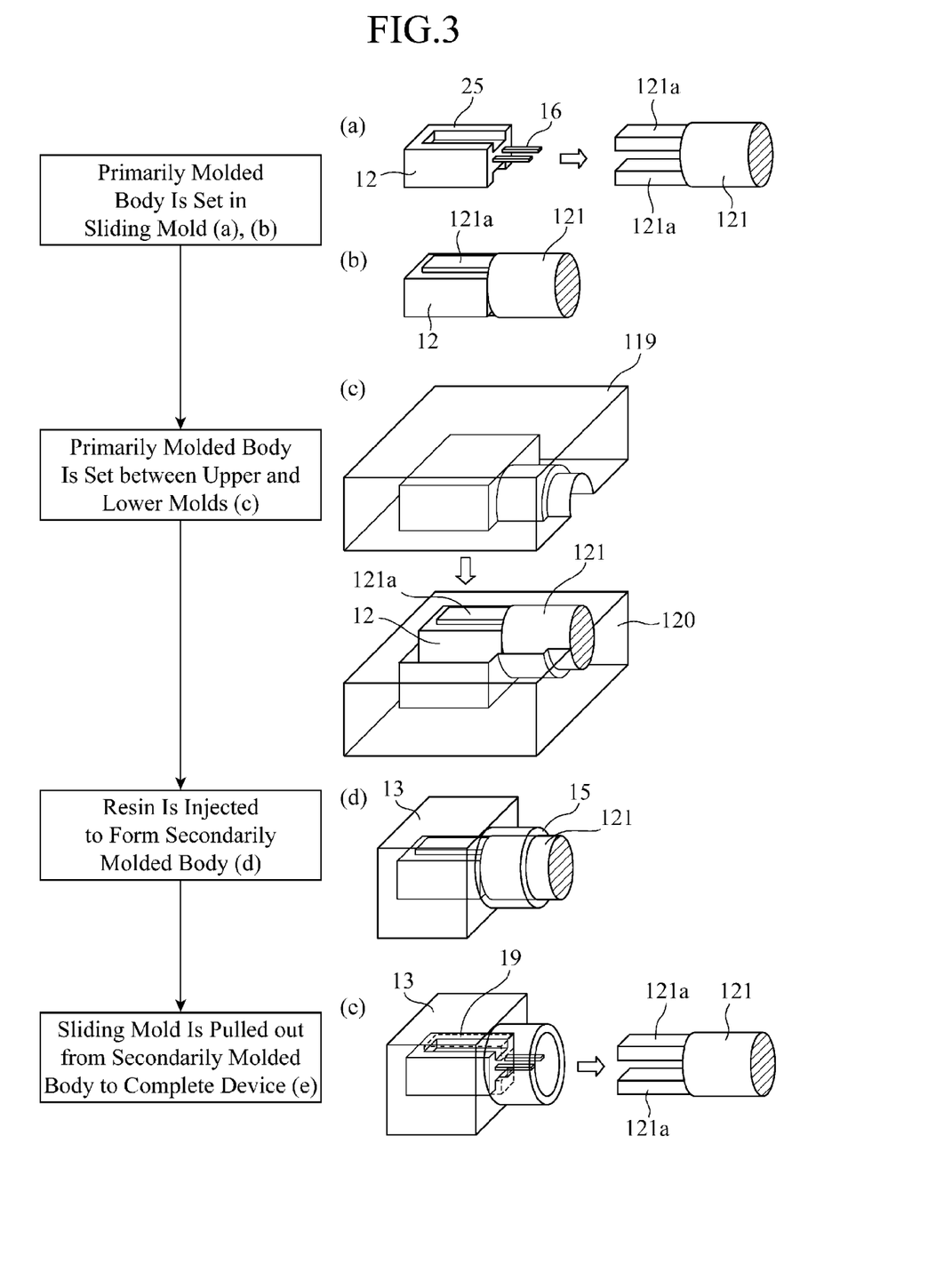
FIG. 3 is an explanatory view showing a molding method of a secondarily molded body for the vehicle condition detection device of the first embodiment thereof.

FIG. 2 shows a structure of a molding mold for the vehicle condition detection device, and FIG. 3 shows a method of manufacturing the secondarily molded body (however, the device fastening portion is not depicted). The molding process of the secondarily molded body 13 of the vehicle condition detection device is performed by using at least three molds: an upper mold 119, a lower mold 120, and a sliding mold 121.

The primarily molded body 12 fabricated by the primary molding process is set between a pair of gripping members 121a to be thereby temporarily held by the sliding mold 121. Then, the primarily molded body 12 temporarily held by the sliding mold 121 is mounted on the lower mold 120 for forming integrally the device casing, the connector housing portion, and the device fastening portion. Then, the upper mold 119 corresponding to the upper side of the lower mold 120 is mated with each other, and a resin is injected into the molds and cooled to solidify the secondarily molded body 13. In this situation, the peripheral portion serving as the casing is formed, and the internal-diameter portion of the connector housing portion 15 is formed by the sliding mold 121. Then, when the sliding mold 121 is pulled out from the secondarily molded body 13 released from the upper and the lower molds, it is configured that a trace formed by pulling out of the gripping member 121a of the sliding mold forms the hollow portion 19 penetrating from the interior of the connector housing portion to the face area of the primarily molded body 12 that corresponds to the position where the detecting element is disposed.

Since the primarily molded body 12 is treated as an insert component when the secondary molding process is performed, a holding mechanism so as to prevent a dislocation thereof due to an injecting pressure of a molding resin is necessary. In the case of the conventional vehicle condition detection device as discussed above in FIG. 13, the primarily molded body 12 is held by the convex-type primarily molded body holding portions 28, 28 provided in the upper mold 119' and the lower mold 120', while in the case of the present invention, since it is arranged that the primarily molded body is held by the sliding mold 121, a holding mechanism for the upper mold 119 and lower mold 120 can be eliminated. As a result, a sealing member and a sealing process required in subsequent processes as in the typical device can be removed, and also there is no need to take into account affections onto the detecting element 11 due to them.

Furthermore, as discussed in the foregoing, when the secondary molding process is carried out with the primarily molded body 12 set in the sliding mold 121, the portion held by the sliding mold 121 becomes the hollow portion 19 between the internal face of the connector housing portion 15 and the external face of the primarily molded body 12 after release of the mold. Consequently, the detecting element 11 inserted into the primarily molded body 12 will be covered with the secondarily molded body 13 functioning as the casing by way of the hollow portion 19. Since the detecting element 11 and the secondarily molded body 13 are isolated from each other by the hollow portion 19, the detecting element 11 is hardly directly subjected to a thermal stress in and after the secondary molding process. This greatly contributes to stabilizing the electric characteristics of the device against variations in the manufacture thereof, and protecting the stabilized temperature characteristics and ensuring the characteristic stability against age deterioration.

It is to be noted that the detecting element 11 may be provided with a circuit for electrically processing a detection signal, and it may be arranged that electronic components such as a signal processing circuit, a resistor, and a capacitor are mounted on the lead frame 18 together with the detecting element 11.

Figure 4:
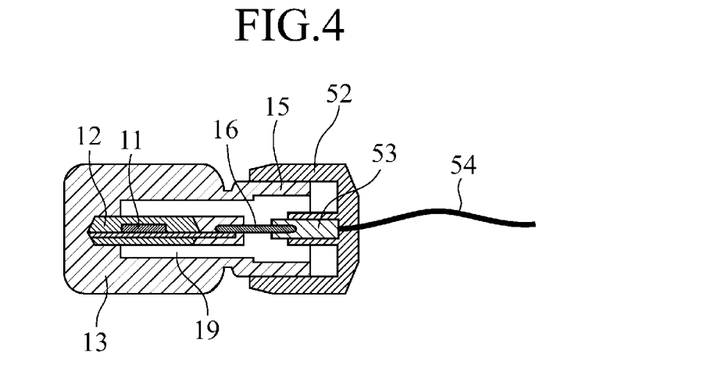
FIG. 4 is a sectional view showing a connector fitting state where the vehicle condition detection device of the first embodiment thereof.

FIG. 4 shows a fitting state of an external connector to a vehicle condition detection device. A connector terminal 53 of a connector 52 as the counterpart is connected to the connector terminal 16 of the vehicle condition detection device, and a signal harness 54 for transmitting a detection signal is connected to the connector terminal 53. In the state where the vehicle condition detection device works as a product, the connector 52 as the counterpart is connected thereto; thus, the hollow portion 19 within the connector housing portion 15 is isolated from the outside by the housing portion of the connector 52 as the counterpart and the primarily molded body 12 is not directly exposed to the outside. Moreover, when a waterproof capability is enhanced in a fitting structure of the connector housing portion 15 and the corresponding connector 52, and a structure of the connector 52 as the counterpart, a waterproof performance for the device can be easily ensured. In particular, with respect to the resistance to water, it is configured that the secondarily molded body 13 is seamless around the perimeter of the casing, and thus high reliability thereof can be expected.

As discussed above, according to the first embodiment, the molding process is implemented by the molds such that the hollow portion 19 within the connector housing portion 15 to be formed by the secondary molding process is penetrated to the face area of the primarily molded body 12 corresponding to the position of the detecting element 11. Therefore, at the time of the secondary molding process, the resin used for the molding is positioned away from the detecting element to thus cause hard applying the thermal stress of the injected resin to the detecting element. As a result, the occurrence of variations in the characteristics can be prevented. Further, in the case where the vehicle condition detection device is in service, the hollow portion is prepared between the secondarily molded body and the detecting element, and thus the application of the stress on the second-mold side to the detecting element can be avoided. In general, in a similar type of device, a thermoplastic resin is employed for the resin of a casing thereof, in consideration of the shock resistance and/or the molding properties for a connector housing; however, since the thermoplastic resin induces a large thermal stress upon molding, it has been difficult to subject a molded detecting element to double molding. However, according to the present invention, the thermoplastic resin is also available. Furthermore, when the connector as the counterpart is fitted therein at the time of use, the hollow portion can be easily sealed by the waterproof structure such as packing thereof; thus, air tightness can be secured, the hollow portion need not be purposely closed later, and a sealing member and/or post processings are eliminated. Furthermore, a small-sized, lightweight, and high-reliability vehicle condition detection device can be achieved at low-cost.

Second Embodiment

Figure 5:
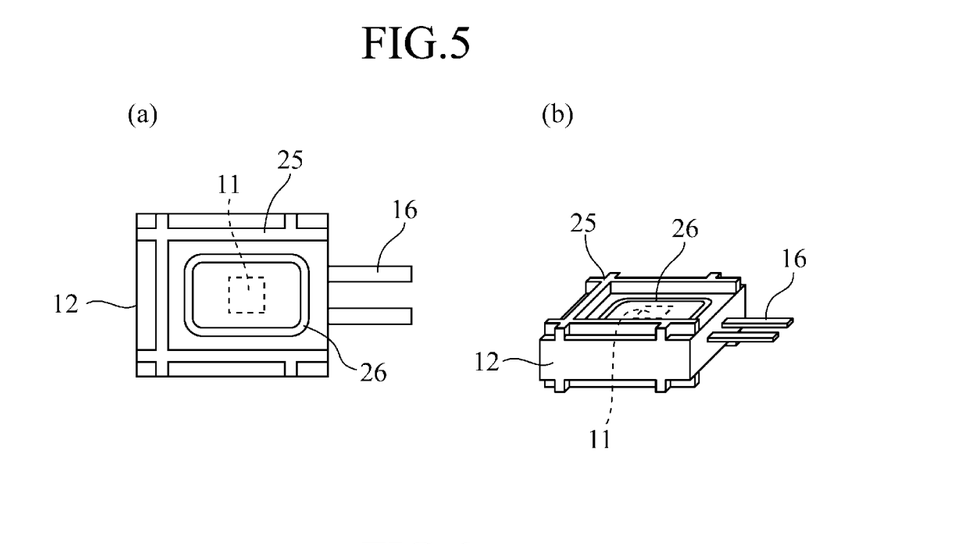
FIG. 5 is an explanatory view showing a structure of a primarily molded body of a vehicle condition detection device of a second embodiment of the invention.

FIG. 5 is an explanatory view showing a structure of a primarily molded body for a vehicle condition detection device of a second embodiment of the invention.

A positioning guide 25 having a rib shape is provided to surround the face area corresponding to the position of an internal detecting element 11 from three directions on opposite two faces of a primarily molded body 12 to be gripped by a sliding mold 121. The positioning guide 25 regulates the mounting position of the primarily molded body 12 to the sliding mold 121. This makes sure the positional relationship between the detecting element 11 and the secondarily molded body 13, and enhances the dimensional precision of the product. Further, there is no occurrence of an inclination and so on of the detecting element 11 to thus improve the stability of the characteristics in the product. Also, the arrangement of the positioning guide 25 can increase the area where the primarily molded body 12 comes in contact with the sliding mold 121 in performing a secondary molding process, and also can increase the flow resistance of a molding resin; thus, the flow of the resin in the secondary molding process from these gaps to the inside surrounded by the positioning guide 25, that is, the vicinity of the detecting element 11 can be prevented.

Moreover, as shown in FIG. 5(a), a groove 26 is prepared on the primarily molded body 12 to enclose the face area corresponding to the position of the detecting element 11 inside the positioning guide 25. In performing the secondary molding process, even if the molding resin flows in from a gap between the primarily molded body 12 and the sliding mold 121, the resin can be retained before reaching the vicinity of the detecting element 11 by the groove 26. Therefore, the arrangement of the positioning guide 25 and the groove 26 can secure more positively the hollow portion 19 provided in the portion corresponding to the detecting element 11.

In addition, though it is more preferable to prepare the positioning guide 25 and the groove 26 on two or more faces of the primarily molded body 12, such an effect can be expected even when they are prepared on only one face thereof. Further, in FIG. 5, though the positioning guide 25 is provided in a convex shape, it can be provided in a concave shape; a similar effect can be expected.

Third Embodiment

Figure 6:
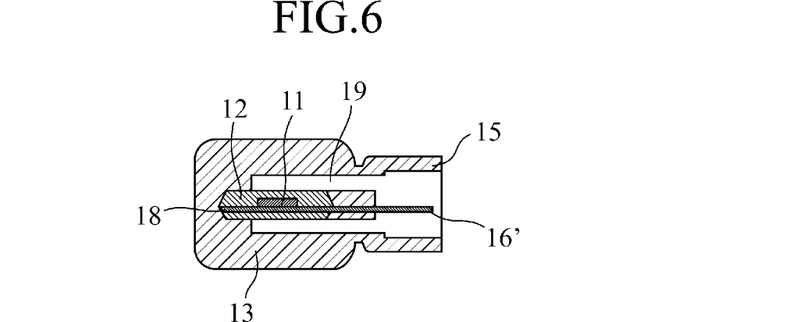
FIG. 6 is an explanatory view showing a structure of a full-mold mounting type of a vehicle condition detection device of a third embodiment of the invention.

FIG. 6 is a sectional view showing a structure of a full-mold mounting type of a vehicle condition detection device of a third embodiment of the invention. In the figure, the parts corresponding to those of FIG. 1 are designated by similar numerals, and similar explanations of the parts will be omitted.

In the structure of the primarily molded body in the first embodiment discussed above, the lead terminal 14 formed from the lead frame 18 is connected to the connector terminal 16 at a different elevation by welding; however, in the third embodiment, as shown in FIG. 6, the lead terminal 14 of the lead frame 18 is extended to serve as a connector terminal 16' and have a structure integrally formed on the same plane.

Since the connector terminal is arranged as described above, it becomes possible to reduce the number of components and reduce process steps for joining the two components to thus lower the price of a vehicle condition detection device. Furthermore, the lead frame 18 and the connector terminal 16' integrated to each other are flush with each other; accordingly, the primarily molded body 12 can be provided in a slim configuration. This contributes to not only a downsizing of the device, but also an easy formation of a structure where a hollow portion within a connector housing portion 15 is extended to the vicinity of a detecting element 11.

Fourth Embodiment

Figure 7:
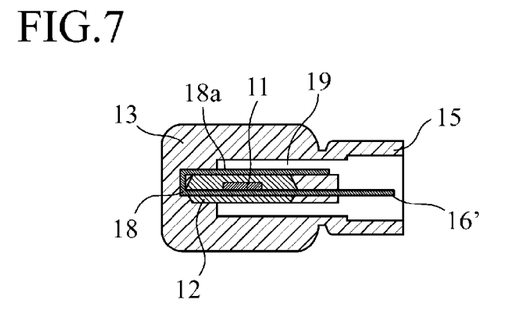
FIG. 7 is a sectional view showing a worked structure of a lead frame of a vehicle condition detection device of a fourth embodiment of the invention.

FIG. 7 is a sectional view showing a structure of a full-mold mounting type of a vehicle condition detection device of a fourth embodiment of the invention. In the figure, the parts corresponding to those of FIG. 6 are designated by similar numerals, and similar explanations of the parts will be omitted.

According to the fourth embodiment, the member forming a lead frame 18 is extended on the side thereof opposite from a connector terminal 16' to form a turned-back portion 18a for covering the detecting element 11. An electromagnetic shielding effect can be expected due to the formation of the turned-back portion 18a. However, it is preferable to use a lead frame on the side of a GND terminal for the turned-back portion 18a.

Figure 8:
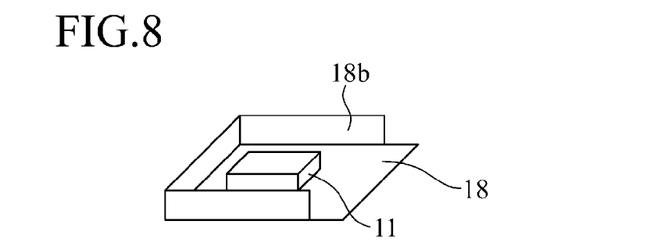
FIG. 8 is a perspective view showing another worked structure of a lead frame of the vehicle condition detection device of the fourth embodiment thereof.

Further, as shown in FIG. 8, a turn-raised portion 18b is provided by turning and raising the lead frame 18 around the detecting element 11. The arrangement of the turn-raised portion 18b can increase the stiffness of the lead frame 18 against the warpage and the distortion, can increase the tolerance thereof to a thermal stress brought about by a resin molding and/or a stress caused by an external force, and also the retention of the electromagnetic shielding effect can be expected.

Fifth Embodiment

Figure 9:
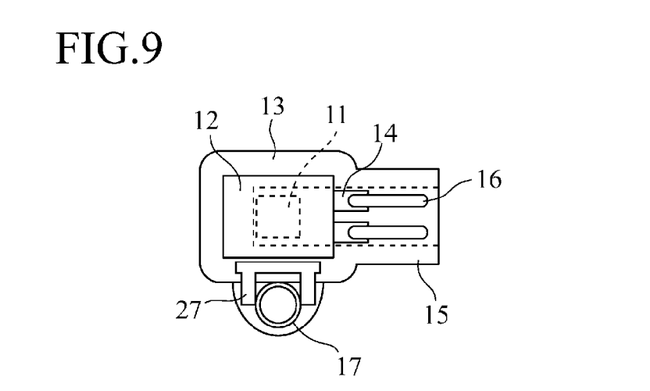
FIG. 9 is a perspective plan view showing a reinforced structure of a vehicle condition detection device of a fifth embodiment of the invention.

FIG. 9 is a perspective plan view showing a reinforced structure of a vehicle condition detection device of a fifth embodiment of the invention. In the figure, the parts corresponding to those of FIG. 1 are designated by similar numerals, and similar explanations of the parts will be omitted.

A secondarily molded body 13 necessarily has a natural frequency. If a detecting element 11 resonates in response to a device fastening portion 17, the element will output an unexpected state, which poses a problem as a device for detecting a vehicle condition. Therefore, it is desired that the natural frequency of the secondarily molded body 13 is sufficiently high as compared with a frequency range originally expected as a target to be detected. In this case, it is necessary to ensure the stiffness of the structure from the fastening portion 17 to the detecting element 11; however, there is generally a limitation thereof in a thermoplastic resin used for a casing. Therefore, a reinforcing member 27 made of a material that is higher in Young's modulus than that of a resin constituting the secondarily molded body 13 is inserted in the resin portion where a certain stiffness is to be ensured so as to reinforce the casing, thus increasing the stiffness thereof.

Figure 10:
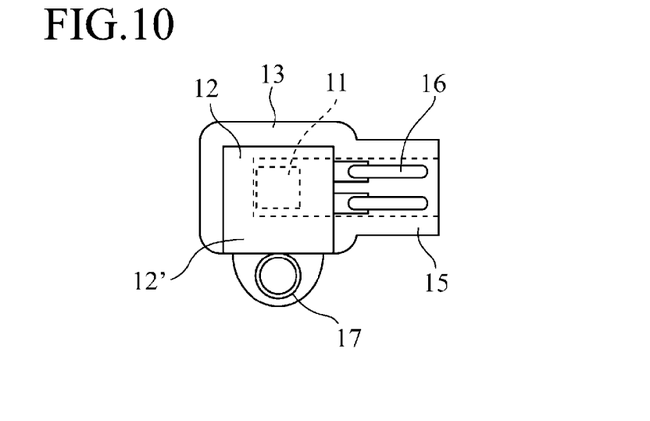
FIG. 10 is a perspective plan view showing another example of the reinforced structure of the vehicle condition detection device of the fifth embodiment thereof.
Figure 11:
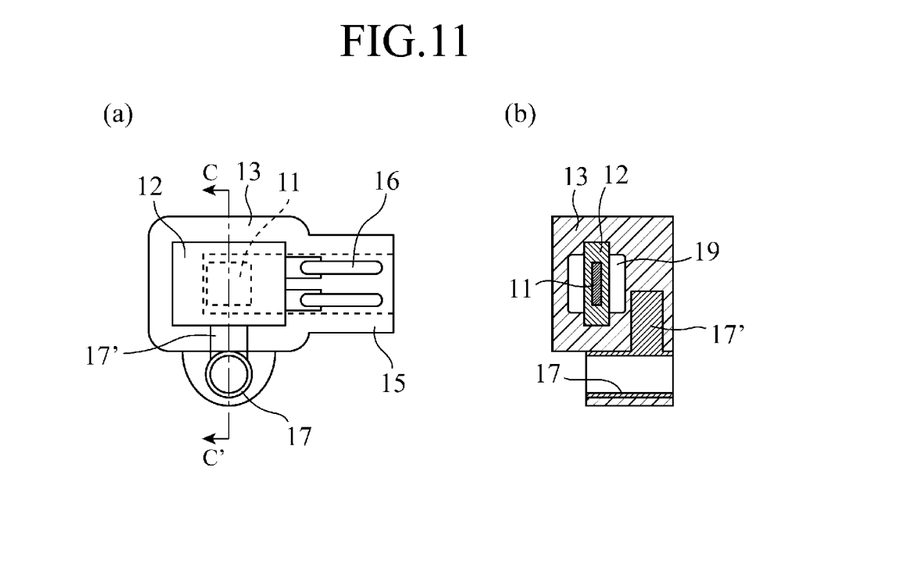
FIG. 11 is a perspective plan view further showing another example of the reinforced structure of the vehicle condition detection device of the fifth embodiment thereof.

Moreover, the reinforcing member 27, instead of adding a new material thereto, may be provided by an extension portion 12' provided to the existing primarily molded body 12 and made of the same material, as shown in FIG. 10, or an extension portion 17' provided to a cylindrical part (e.g., a metal bush) used for the device fastening portion 17 and made of the same material, as shown in FIG. 11. Such extension portions 12', 17' can also increase the characteristic frequency of the device to thereby increase the stiffness of the secondarily molded body 13. Since the increase of stiffness from those methods also has an effect of reducing the thickness of the thermoplastic resin constituting the secondarily molded body 13, it is useful as measures for the reduction of avoid in the resin to be produced in the secondary molding process.

INDUSTRIAL APPLICABILITY

As discussed above, in the vehicle condition detection device and the method of manufacturing the device of the invention, in order to subject the primarily molded detecting element body to the secondary molding process, it is arranged that the hollow portion within the connector housing portion to be formed in the secondary molding process is penetrated to the face area of the primarily molded body corresponding to the position of the detecting element; thus, it is suitable for preventing the detecting element from being subjected to a thermal stress in the molding process.

The invention claimed is:

1. A vehicle condition detection device comprising:
a secondary molded body including a connector housing portion integrally formed with a device fastening portion;
a detecting element mounted on a lead frame; and
a resin-molded primary molded body, which is molded around the detecting element and the lead frame,
wherein the secondary molded body encases the primary molded body and supports one end of the primary molded body in such manner that a face area of the primary molded body corresponding to a position of the detecting element is interposed in a hollow portion within the connector housing portion.

2. The vehicle condition detection device according to claim 1, wherein a positioning guide for determining a position to be mounted to a sliding mold is provided on the primary molded body to surround the face area of the primary molded body corresponding to the position of the detecting element.

3. The vehicle condition detection device according to claim 2, wherein the positioning guide is formed in a rib shape.

4. The vehicle condition detection device according to claim 2, wherein the primary molded body is provided with a groove enclosing the face area of the primary molded body corresponding to the position of the detecting element inside the positioning guide.

5. The vehicle condition detection device according to claim 1, wherein a lead terminal from the detecting element that is extended from the primary molded body and disposed within the connector housing portion, and a connector terminal to be connected with a connector as the counterpart are integrally formed by a lead frame.

6. The vehicle condition detection device according to claim 5, wherein the lead terminal and the connector terminal are formed flush with each other.

7. The vehicle condition detection device according to claim 5, wherein the lead frame has a turned-back portion formed such that the side thereof opposite from the connector terminal is extended to cover the detecting element.

8. The vehicle condition detection device according to claim 5, wherein the lead frame has a turn-raised portion around the periphery of the primary molded body corresponding to the position of the detecting element.

9. The vehicle condition detection device according to claim 1, wherein the secondary molded body has a reinforcing member made of a material that is higher in Young's modulus than that of the resin of the secondary molded body, and that is interposed between the detecting element and the device fastening portion.

10. The vehicle condition detection device according to claim 9, wherein the reinforcing member is formed by an expansion portion that is provided to the primary molded body and made of the same material as that of the primary molded body.

11. The vehicle condition detection device according to claim 9, wherein the reinforcing member is formed by an expansion portion that is provided to a metal cylindrical component used for the device fastening portion provided in the secondary molded body and made of the same material as that of the component.

* * * * *